(12) United States Patent
Hiroe et al.

(10) Patent No.: US 11,334,414 B2
(45) Date of Patent: May 17, 2022

(54) ABNORMALITY DETECTING APPARATUS, ROTATING MACHINE, ABNORMALITY DETECTION METHOD, AND NON-TRANSITORY COMPUTER READABLE MEDIUM

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP); Yoshikatsu Ikawa, Tokyo (JP); Ryo Sase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 227 days.

(21) Appl. No.: 16/790,271

(22) Filed: Feb. 13, 2020

(65) Prior Publication Data

US 2020/0285531 A1    Sep. 10, 2020

(30) Foreign Application Priority Data

Mar. 4, 2019 (JP) .............................. JP2019-038525
Feb. 6, 2020 (JP) .............................. JP2020-019207

(51) Int. Cl.
*G06F 11/00* (2006.01)
*G06F 17/16* (2006.01)
*G06F 11/07* (2006.01)

(52) U.S. Cl.
CPC ............ *G06F 11/076* (2013.01); *G06F 17/16* (2013.01)

(58) Field of Classification Search
CPC .............................. G06F 11/076; G06F 17/16
See application file for complete search history.

(56) References Cited

U.S. PATENT DOCUMENTS 11,093,316 B2 * 8/2021 Hiroe ................... G06F 11/0751
2004/0064277 A1 4/2004 Samata et al.
(Continued)

FOREIGN PATENT DOCUMENTS

JP             3692106 B2      9/2005

OTHER PUBLICATIONS

Gregg,Seth, Feature selection and adaptive threshold for automated cavitation detection in hydroturbines, 2016, https://mountainscholar.org/bitstream/handle/11124/170426/Gregg_mines_0052N_11104.pdf?sequence=1 (Year: 2016).*
(Continued)

*Primary Examiner* — Justin R Knapp
(74) *Attorney, Agent, or Firm* — Manabu Kanesaka; Benjamin Hauptman; Kenneth Berner

(57) ABSTRACT

An abnormality detecting apparatus that is configured to detect a presence or absence of an abnormality in a rotating machine includes a processor that is configured to execute a measured value acquisition process of acquiring, on the basis of a detection signal output from a vibration sensor that is configured to measure vibration caused by rotation of the rotating machine, a measured value including an amplitude and a phase of the vibration; a Mahalanobis distance calculation process of calculating a Mahalanobis distance of the measured value acquired at a time point at which the rotating machine is evaluated on the basis of a unit space configured with a plurality of measured values acquired at a plurality of past time points; and a determination process of determining that an abnormality has occurred in the rotating machine in a case where the calculated Mahalanobis distance exceeds a predetermined threshold value.

9 Claims, 5 Drawing Sheets

(56) References Cited

U.S. PATENT DOCUMENTS

2008/0198950 A1\* 8/2008 Suyama .............. G06F 11/0751
　　　　　　　　　　　　　　　　　　　　　375/340
2010/0235140 A1\* 9/2010 Satonaga ............... G06K 9/623
　　　　　　　　　　　　　　　　　　　　　702/179

OTHER PUBLICATIONS

Chuan Li et al, Fault Diagnosis for Rotating Machinery Using Vibration Measurement Deep Statistical Feature Learning, 2016, https://www.ncbi.nlm.nih.gov/pmc/articles/PMC4934321/pdf/sensors-16-00895.pdf (Year: 2016).\*

\* cited by examiner

ABNORMALITY DETECTING APPARATUS, ROTATING MACHINE, ABNORMALITY DETECTION METHOD, AND NON-TRANSITORY COMPUTER READABLE MEDIUM

BACKGROUND OF THE INVENTION

Field of the Invention

The present invention relates to an abnormality detecting apparatus, a rotating machine, an abnormality detection method, and a non-transitory computer readable medium.

Priority is claimed on Japanese Patent Application No. 2019-038525, filed Mar. 4, 2019, and Japanese Patent Application No. 2020-019207, filed Feb. 6, 2020, the contents of which are incorporated herein by reference.

Description of Related Art

As a technique of diagnosing the soundness of a test object, a method of detecting an abnormality using a Mahalanobis-Taguchi (MT) system is known. In the MT system, a Mahalanobis distance is calculated using an inverse matrix of a covariance matrix of reference data (for example, a group of measured values of various characteristic items under normal conditions). In a case where the calculated Mahalanobis distance exceeds a predetermined threshold value, the state of the test object can be determined to be abnormal.

For example, a technique of calculating the Mahalanobis distance using chronological data such as an amplitude and a phase obtained by performing frequency analysis on vibration caused by rotation of a rotational shaft as reference data in a case where a state of a rotating machine is evaluated is known (for example, see Japanese Patent No. 3692106).

In the related art, each of the amplitude and the phase of the vibration of the rotational shaft is input to the reference data as independent measured values. However, since the amplitude and the phase are a pair of information indicating a feature quantity of the vibration at a certain time point, if the amplitude and the phase are handled individually as independent measured values as described above, there is a possibility that the abnormality of the rotating machine is unable to be detected accurately.

In the MT method, there is the possibility of the accuracy of calculation of a Mahalanobis distance decreasing depending on the property of a covariance matrix obtained from the reference data. Specifically, for example, in a case where there is a strong correlation between characteristic items constituting the reference data (the absolute value of a correlation coefficient is close to 1), and a case where the number of pieces of data included in the reference data is smaller than the number of characteristic items, the inverse matrix of the covariance matrix is not able to be calculated, and thus there is the possibility of the accuracy of calculation of a Mahalanobis distance decreasing. As a countermeasure against this, in, for example, Japanese Unexamined Patent Application, First Publication No. 2003-141306, calculating the cofactor matrix of a covariance matrix instead of an inverse matrix, and using a method of calculating a Mahalanobis distance using this cofactor matrix (an MTA method) is considered.

The MTA method disclosed in Japanese Unexamined Patent Application, First Publication No. 2003-141306 is effective in a case where the rank of the covariance matrix decreases by one compared with the number of characteristic values, but there is the possibility of a Mahalanobis distance not being able to be calculated in the case of decrease by two or more. For this reason, as another method, Japanese Patent No. 5101396 discloses a method of obtaining an approximate inverse matrix using the singular value resolution of a covariance matrix, and calculating Mahalanobis distance using this approximate inverse matrix.

However, in a method of the related art as disclosed in Japanese Patent No. 5101396, an approximate inverse matrix is obtained, by removing a component having a small singular value of a covariance matrix so that the component having a small singular value does not influence a Mahalanobis distance. Therefore, in a case where an abnormality occurs in an inspection target, and the influence of this abnormality appears in the component having a small singular value, in a method of substituting an approximate inverse matrix of the related art, there is the possibility of the sensitivity of abnormality detection decreasing.

SUMMARY OF THE INVENTION

The present invention provides an abnormality detecting apparatus, a rotating machine, an abnormality detection method, and a non-transitory computer readable medium which are capable of improving the accuracy of abnormality detection in the rotating machine.

According to a first aspect of the present invention, an abnormality detecting apparatus that is configured to detect the presence or absence of an abnormality in a rotating machine includes a processor that is configured to execute a measured value acquisition process of acquiring, on the basis of a detection signal output from a vibration sensor that is configured to measure vibration caused by rotation of the rotating machine, a measured value including an amplitude and a phase of the vibration, a Mahalanobis distance calculation process of calculating a Mahalanobis distance of the measured value acquired at a time point at which the rotating machine is evaluated on the basis of a unit space configured with a plurality of measured values acquired at a plurality of past time points, and a determination process of determining that an abnormality has occurred in the rotating machine in a case where the calculated Mahalanobis distance exceeds a predetermined threshold value. Accordingly, the abnormality detecting apparatus can treat the feature quantity of the vibration caused by the rotation of the rotating machine as a pair of measured values including the amplitude and the phase, and thus the accuracy of detecting the abnormality in the rotating machine can be improved.

According to a second aspect of the present invention, the processor of the abnormality detecting device according to the first aspect is configured to measure the vibration at a plurality of different observation positions in the measured value acquisition process, and acquire a plurality of measured values corresponding to each of the plurality of observation positions. Accordingly, the abnormality detecting apparatus can detect the abnormality in the rotating machine more accurately.

According to a third aspect of the present invention, in the abnormality detecting apparatus according to the first or second aspect, the measured value is represented as a complex number which converted from the amplitude and the phase of the vibration. Accordingly, the abnormality detecting apparatus can treat the amplitude and the phase of the vibration as one measured value represented by a complex number rather than as independent measured values, and thus the accuracy of detecting the abnormality in the rotating machine can be further improved.

According to a fourth aspect of the present invention, a rotating machine includes a rotational shaft, a vibration sensor that is configured to measure vibration of the rotational shaft, and the abnormality detecting apparatus according to any one of claims 1 to 3.

According to a fifth aspect of the present invention, an abnormality detection method of detecting the presence or absence of an abnormality in a rotating machine includes a step of acquiring, on the basis of a detection signal output from a vibration sensor that is configured to measure vibration caused by rotation of the rotating machine, a measured value including an amplitude and a phase of the vibration, a step of calculating a Mahalanobis distance of the measured value acquired at a time point at which the rotating machine is evaluated on the basis of a unit space configured with a plurality of measured values acquired at a plurality of past time points, and a step of determining that an abnormality has occurred in the rotating machine in a case where the calculated Mahalanobis distance exceeds a predetermined threshold value.

According to a sixth aspect of the present invention, a non-transitory computer readable medium storing a program that causes a computer of an abnormality detecting apparatus that is configured to detect, the presence or absence of an abnormality in a rotating machine execute a step of acquiring, on the basis of a detection signal output from a vibration sensor that is configured to measure vibration caused by rotation of the rotating machine, a measured value including an amplitude and a phase of the vibration, a step of calculating a Mahalanobis distance of the measured value acquired at a time point at which the rotating machine is evaluated on the basis of a unit space configured with a plurality of measured values acquired at a plurality of past time points, and a step of determining that an abnormality has occurred in the rotating machine in a case where the calculated Mahalanobis distance exceeds a predetermined threshold value.

According to a seventh aspect of the present invention, in the abnormality detecting apparatus according to the first or second aspect, the processor is configured to measure the vibration on at least one of a plurality of observation positions in the measured value acquisition process, and acquire the measured value including amplitude and a phase of a plurality of frequencies included in vibration on at least one of the plurality of the observation positions. Accordingly, the abnormality detecting apparatus can detect the abnormality in the rotating machine more accurately.

According to an eighth aspect of the present invention, an abnormality detecting apparatus that is configured to detect the presence or absence of an abnormality in a rotating machine includes a processor that is configured to execute: a measured value acquisition process of acquiring, on the basis of a detection signal output from a vibration sensor that is configured to measure vibration caused by rotation of the rotating machine, a measured value including an amplitude and a phase of the vibration; a component calculation process of calculating a plurality of components into which the measured value is decomposed with respect to a direction of a singular vector obtained by performing a singular value decomposition of a unit space configured of a plurality of measured values acquired at a plurality of points in the past; a comparing process of comparing a magnitude of the plurality of components into which the measured value is decomposed with respect to the direction of the singular vector with the plurality of singular values obtained by performing the singular value decomposition of the unit space individually with respect to the direction of the singular vector; and a determination process of determining that an abnormality has occurred in the rotating machine based on a result of the comparing process. In this manner, the abnormality detecting apparatus compares the component with the singular value with respect to the direction of the singular vector, and thus even in a case where the singular value is zero or a small value, the singular value can be used in an abnormality determination without being excluded. As a result, the abnormality detecting apparatus can suppress a decrease in the sensitivity of abnormality detection, and improve the accuracy of abnormality detection.

According to an ninth aspect of the present invention, an abnormality detecting method of detecting the presence or absence of an abnormality in a rotating machine includes: a step of acquiring, on the basis of a detection signal output from a vibration sensor that is configured to measure vibration caused by rotation of the rotating machine, a measured value including an amplitude and a phase of the vibration; a step of calculating a plurality of components into which the measured value is decomposed with respect to a direction of a singular vector obtained by performing a singular value decomposition of a unit space configured of a plurality of measured values acquired at a plurality of points in the past; a step of comparing a magnitude of the plurality of components into which the measured value is decomposed with respect to the direction of the singular vector with plurality of singular values obtained by performing the singular value decomposition of the unit space individually with respect to the direction of the singular vector; and a step of determining that an abnormality has occurred in the rotating machine based on a result of the comparing step.

According to an tenth aspect of the present invention, a non-transitory computer readable medium storing a program that causes a computer of an abnormality detecting apparatus that is configured to detect the presence or absence of an abnormality in a rotating machine to execute: a step of acquiring, on the basis of a detection signal output from a vibration sensor that is configured to measure vibration caused by rotation of the rotating machine, a measured value including an amplitude and a phase of the vibration; a step of calculating a plurality of components into which the measured value is decomposed with respect to a direction of a singular vector obtained by performing a singular value decomposition of a unit space configured of a plurality of measured values acquired at a plurality of points in the past; a step of comparing a magnitude of the plurality of components into which the measured value is decomposed with respect to the direction of the singular vector with the plurality of singular values obtained by performing the singular value decomposition of the unit space individually with respect to the direction of the singular vector; and a step of determining that an abnormality has occurred in the rotating machine based on a result of the comparing step.

According to the abnormality detecting apparatus, the rotating machine, the abnormality detection method, and the non-transitory computer readable medium according to any one of the aspects, the accuracy of the abnormality detection in the rotating machine can be improved.

PREFERRED EMBODIMENTS (Overall Configuration of Rotating Machine)

A rotating machine 100 according to an embodiment of the present invention will be described below with reference to the appended drawings.

Figure 1:
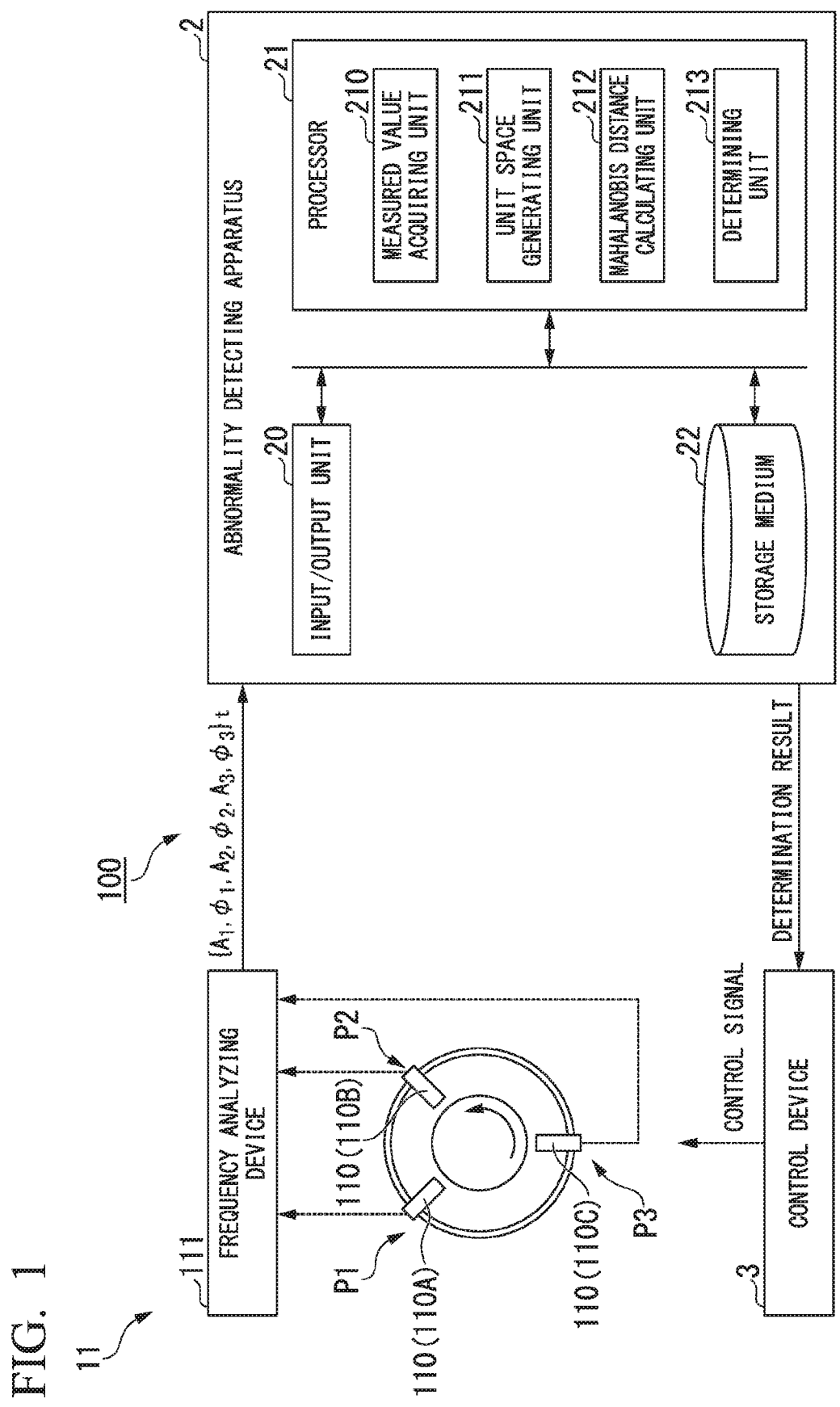
FIG. 1 is a diagram showing a configuration of a rotating machine according to an embodiment of the present invention.

FIG. 1 is a diagram showing a configuration of a rotating machine according to an embodiment of the present invention.

As shown in FIG. 1, the rotating machine 100 includes a rotational shaft 10, a vibration measuring device 11, an abnormality detecting apparatus 2, and a control device 3. Examples of the rotating machine 100 include a gas turbine, a steam turbine, a compressor, an electric motor, a vehicle wheel, a vehicle axle, and equipment inside of which these are arranged.

The vibration measuring device 11 includes a vibration sensor 110 and a frequency analyzing device 111.

The vibration sensor 110 measures a vibration waveform generated by the rotation of the rotational shaft 10 at predetermined intervals. In the present embodiment, as shown in FIG. 1, a plurality of vibration sensors 110A, 110B, and 110C are disposed at different observation positions P1, P2, and P3 of the rotational shaft 10, respectively. Further, although FIG. 1 shows an example in which three vibration sensors 110 are disposed, the present invention is not limited thereto. There may be two or four or more vibration sensors 110. Further, the vibration sensors are not limited to sensors that directly measure the vibration of the rotational shaft. For example, they may be sensors that measure vibration of a mounting base of a gas turbine, a compressor, a vehicle axle or the like. Further, in a case where the vibration sensor provides an amplitude and a phase of each of a plurality of frequency components or a complex number indicating an amplitude and a phase of each of the plurality of frequency components, the measured values equivalent to that measured by a plurality of the vibration sensor can be obtained. Thus, in this case, the vibration measuring device 11 may include only one vibration sensor.

The frequency analyzing device 111 performs frequency analysis on a measured result (a detection signal) output from the vibration sensors 110, and outputs a detection signal including two values, that is, an amplitude A and a phase $\Phi$ of vibration of each frequency, to the abnormality detecting apparatus 2. In the example of FIG. 1, the frequency analyzing device 111 acquires measured results at a time t from the vibration sensors 110A, 110B, and 110C disposed at the plurality of observation positions P1, P2, and P3, respectively. Further, the frequency analyzing device 111 performs frequency analysis on the measured results obtained from the vibration sensors 110A, 110B, and 110C, respectively, and obtains an amplitude $A_1$ and phase $\Phi_1$ of the vibration at the observation position P1, obtains an amplitude $A_2$ and phase $\Phi_2$ of the vibration at the observation position P2, and obtains an amplitude $A_3$ and phase $\Phi_3$ of the vibration at the observation position P3. Further, the frequency analyzing device 111 outputs $\{A_1, \Phi_1, A_2, \Phi_2, A_3, \Phi_3\}_t$ to the abnormality detecting apparatus 2 as the detection signals at the observation positions P1 to P3 at the time t.

The abnormality detecting apparatus 2 acquires the detection signal output from the vibration measuring device 11 (the vibration sensors 110), determines whether or not an abnormality occurs in the rotating machine 100, and outputs a determination result to the control device 3. A functional configuration of the abnormality detecting apparatus 2 will be described later.

The control of device 3 generates a control signal for controlling the rotating machine 100. For example, in a case where a determination result indicating that an abnormality has occurred in the rotating machine 100 is received from the abnormality detecting apparatus 2, the control device 3 generates a control signal for stopping the operation of the rotating machine 100.

(Functional Configuration of Abnormality Detecting Apparatus)

Next, a functional configuration of the abnormality detecting apparatus 2 will be described with reference to FIG. 1.

As shown in FIG. 1, the abnormality detecting apparatus 2 includes an input/output unit 20, a processor 21, and a storage medium 22.

The input/output unit 20 receives the detection signal input regarding the vibration of the rotational shaft 10 from the vibration measuring device 11 at predetermined intervals. Further, the input/output unit 20 outputs the detection result of the abnormality detecting apparatus 2 to the control device 3.

The processor 21 controls an overall operation of the abnormality detecting apparatus 2. The processor 21 operates in accordance with a program to function as a measured value acquiring unit 210, a unit space generating unit 211, a Mahalanobis distance calculating unit 212, and a determining unit 213.

The measured value acquiring unit 210 executes a process of acquiring the measured value including the amplitude and the phase of the vibration on the basis of the detection signal output from the vibration measuring device 11 (the vibration sensor 110). More specifically, the measured value acquiring unit 210 acquires a complex number which is converted from the amplitude and the phase of the vibration as the measured value.

The unit space generating unit 211 executes a process of generating a unit space including a plurality of measured values acquired at a plurality of past time points. Further, the unit space generating unit 211 executes a process of storing the generated unit space in the storage medium 22.

The Mahalanobis distance calculating unit 212 executes a process of calculating the Mahalanobis distance of the measured value acquired at a time point at which the rotating machine 100 is evaluated on the basis of the unit space.

The determining unit 213 executes a process of determining whether or not an abnormality has occurred in the rotating machine 100 on the basis of the calculated Mahalanobis distance. Specifically, the determining unit 213 determines that an abnormality has occurred in the rotating machine 100 in a case where the calculated Mahalanobis distance exceeds a predetermined threshold value.

The storage medium 22 stores the detection signal acquired from the vibration measuring device 11 and the unit space generated by the unit space generating unit 211.

(Process Flow of Abnormality Detecting Apparatus)

Figure 2:
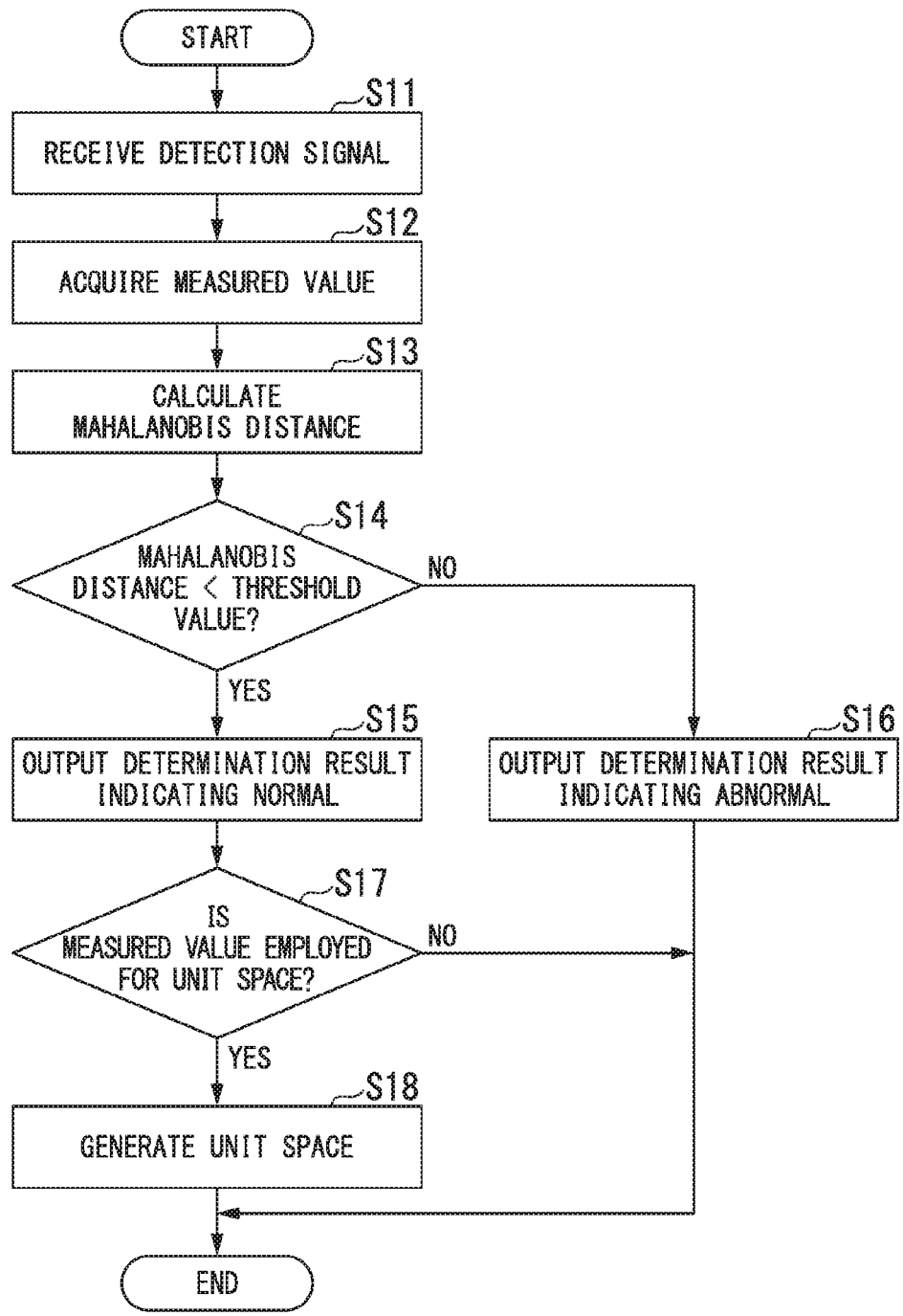
FIG. 2 is a flowchart showing an example of a process of an abnormality detecting apparatus according to an embodiment of the present invention.

FIG. 2 is a flow chart showing an example of a process of the abnormality detecting apparatus according to one embodiment of the present invention. Hereinafter, the flow of the process in which the abnormality detecting apparatus 2 according to the present embodiment monitors the state of the rotating machine 100 will be described in detail with reference to FIG. 2.

As shown in FIG. 2, the measured value acquiring 210 receives the detection signals of the plurality of observation positions P1, P2, and P3 at the time t from the vibration measuring device 11 (step S11). In the present embodiment, the measured value acquiring unit 210 receives the detection signals $\{A_1, \Phi_1, A_2, \Phi_2, A_3, \Phi_3\}_t$ including the amplitude and the phase of the vibration of the plurality of observation positions P1, P2, P3 from the frequency analyzing device 111 of the vibration measuring device 11. Further, the detection signals $\{A_1, \Phi_1, A_2, \Phi_2, A_3, \Phi_3\}_t$ may include the amplitude and the phase of each of the plurality of frequency components provided from one vibration sensor.

Then, the measured value acquiring unit 210 acquires a measured value y including the amplitudes and the phases included in the received detection signals (step S12).

In the method of the related art, the amplitudes $A_1, A_2,$ and $A_3$ and the phases $\Phi_1, \Phi_2,$ and $\Phi_3$ of the observation positions P1, P2, and P3 are treated they were information acquired from different sensors. Therefore, in the method of the related art, the measured value y of the vibration at each observation position is expressed as in the following Formula (1).

$$y = \begin{bmatrix} A_1 \\ A_2 \\ A_3 \\ \phi_1 \\ \phi_2 \\ \phi_3 \end{bmatrix} \quad (1)$$

However, "amplitude $A_1$ and phase $\Phi_1$," "amplitude $A_2$ and phase $\Phi_2$," "amplitude $A_3$ and phase $\Phi_3$" are a pair of information representing the vibration waveform at the observation positions P1, P2, and P3, respectively. Therefore, if the amplitude and the phase at each observation position are treated as independent information acquired from different sensors as in the related art, there is a possibility of the abnormality of the rotating machine 100 being unable to be detected accurately (sensitivity to the abnormality being reduced).

Therefore, the measured value acquiring unit 210 according to the present embodiment does not handle the amplitude and the phase as the independent information but treats them as one measured value including the amplitude and the phase. Specifically, the measured value acquiring unit 210 acquires measured values in which the amplitudes and the phases of the vibration of the observation positions P1, P2, and P3 are converted into complex numbers as indicated in the following Formulas (2), (3), and (4).

$$a_1 + jb_1 = A_1 e^{j\phi_1} \quad (2)$$

$$a_2 + jb_2 = A_2 e^{j\phi_2} \quad (3)$$

$$a_3 + jb_3 = A_3 e^{j\phi_3} \quad (4)$$

Therefore, the measured value acquiring unit 210 acquires the measured value y in which the amplitudes and the phases of the vibration of the observation positions P1, P2, and P3 are converted into the complex numbers as indicated in the following Formula (5).

$$y = \begin{bmatrix} a_1 + jb_1 \\ a_2 + jb_2 \\ a_3 + jb_3 \end{bmatrix} \quad (5)$$

Here, the unit space generated using the measured value y obtained by conversion into the complex number will be described. The unit space is a covariance matrix Q of a plurality of measured values y acquired when the rotating machine 100 is in a normal state and is expressed by the following Formula (6) and Formula (7). In Formula (6), $Y_0$ is a vector in which a plurality of measured values y are arranged in the time direction, and n is the length of the vector. In Formula (7), $Y_0^*$ indicates a conjugate transpose of $Y_0$.

$$Y_0 = [\, y_1 \quad y_2 \quad \ldots \quad y_n \,] \quad (6)$$

$$Q = \frac{1}{N} Y_0 Y_0^* \quad (7)$$

In the example of the process of FIG. 2, it is assumed that the unit space generating unit 211 has already generated the unit space on the basis of a plurality of measured values y acquired at past time points as described above, and the unit space is stored in the storage medium 22.

Then, the Mahalanobis distance calculating unit 212 calculates the Mahalanobis distance of the measured value y acquired at the time t with reference to the unit space stored in the storage medium 22 (step S13). Specifically, the Mahalanobis distance calculating unit 212 calculates a Mahalanobis distance MD at the time t in accordance with the following Formula (8).

$$MD = \sqrt{y^* Q^{-1} y} \quad (8)$$

Then, the determining unit 213 determines whether the state of the rotating machine 100 at the time t is normal or abnormal on the basis of the Mahalanobis distance MD calculated by the Mahalanobis distance calculating unit 212 (step S14).

The measured value y is a complex number, but the Mahalanobis distance MD calculated by the Mahalanobis distance calculating unit 212 is a real value as in the related art. Therefore, the determining unit 213 can determine the presence or absence of an abnormality similarly to the method of the related art. Specifically, the determining unit 213 determines the presence or absence of an abnormality on the basis of whether or not the Mahalanobis distance MD at the time t exceeds a threshold value stored in the storage medium 22 in advance. For example, the threshold value is 3.

In a case where the Mahalanobis distance MD at the time t is equal to or less than the threshold value (YES in step S14), the determining unit 213 determines that the rotating machine 100 is normal. In this case, the determining unit 213 outputs a determination result indicating "normal" to the control device 3 via the input/output unit 20 (step S15).

On the other hand, in a case where the Mahalanobis distance MD at the time t exceeds the threshold value (NO in step S14), the determining unit 213 determines that an abnormality has occurred in the rotating machine 100. In this case, the determining unit 213 outputs a determination result indicating "abnormal" to the control device 3 via the input/output unit 20 (step S16). In a case where the determination result indicating "abnormal" is received, the control device 3 performs control, for example, such that the operation of the rotating machine 100 is stopped.

Further, the unit space generating unit 211 determines whether or not the measured value y at the time t acquired by the measured value acquiring unit 210 is employed for the unit space (step S17). For example, the unit space generating unit 211 employs the measured value y at the time point at which the state of the rotating machine 100 is normal for the unit space at a predetermined update cycle (for example, 4 hours). In this case, in a case where the state of the rotating machine 100 at the time t is normal (YES in step S14), and the predetermined update cycle has elapsed since the last generation of the unit space, the unit space generating unit 211 employs the measured value y at the time t for the unit space (YES in step S17). Then, the unit space generating unit 211 generates a new unit space including the measured value y at the time t using Formula (6) and Formula (7) (step S18). The generated unit space is stored in the storage medium 22.

On the other hand, in a case where the state of the rotating machine 100 at the time t is abnormal (NO in step S14) or in a case where the predetermined update cycle has not elapsed since the last generation of the unit space, the unit space generating unit 211 ends the process without employing the measured value y at the time t for the unit space (NO in step S17).

The abnormality detecting apparatus 2 continuously monitors whether the state of the rotating machine 100 is normal or abnormal by repeating steps S11 to S18.

(Example)

Hereinafter, an example in which the state of the rotating machine 100 is determined using the abnormality detecting apparatus 2 according to the present embodiment will be described. Further, hereinafter, numerical values are used for explanation, but the numerical values are for concrete explanation, and the numerical values do not limit the scope of an embodiment.

The rotational shaft 10 of the rotating machine 100 is an underdamping system, and the cause of vibration with an abnormal level may be considered to be resonance. In other words, a minute disturbance may be considered to be amplified hundreds of times by the resonance of the rotational shaft 10 and detected. In a case where it is the resonance, the vibrations of a plurality of observation positions at which the respective vibration sensors 110 are disposed are connected in a vibration mode shape. Therefore, the observation positions do not vibrate independently but are interlocked in accordance with the mode shape unique to the vibration. Further, when focusing on one observation position, as a frequency dependency of the vibration can be approximated by a response function using rational expressions, the frequency is also interlocked in accordance with the mode shape unique to the vibration.

For example, it is assumed that the vibration sensor 110 measures the vibrations at the three observation positions P1, P2, and P3 as shown in FIG. 1. Then, the measured value acquiring unit 210 acquires the measured value $\{y_1, y_2, y_3\}$ in which the amplitudes and the phases of the vibration at the observation positions P1, P2, and P3 are converted into the complex numbers (step S12 in FIG. 2).

Further, the measured, value $y_1$ at a certain observation position P1 is simulated with a random complex number as indicated in the following Formula (9). Further, in Formula (9), $N(0,1)$ is a random number following a normal distribution in which an average is zero, and a variance is 1.

$$y_1 = N(0,1) + jN(0,1) \tag{9}$$

The measured value $y_1$ converted into the complex number is expressed by the amplitude $A_1$ and the phase $\Phi_1$ as in by the following Formulas (10) and (11).

$$A_1 = \sqrt{\mathrm{Re}(y_1)^2 + \mathrm{Im}(y_1)^2} \tag{10}$$

$$\Phi_1 = \tan^{-1}(\mathrm{Im}(y_1)/\mathrm{Re}(y_1)) \tag{11}$$

As described above, the vibrations of the respective observation positions P1, P2, and P3 are interlocked. If a condition in which the observation positions P1 and P2, and the observation positions P1 and P3 vibrate interlockingly is indicated by transfer functions $g_{21}$ and $g_{31}$, the measured value $y_2$ of the observation position P2 and the measured value $y_3$ of the observation position P3 are indicated by Formulas (12) and (13). In Formulas (12) and (13), $\delta_2$ and $\delta_3$ are observation noises.

$$y_2 = g_{21} y_1 + \delta_2 \tag{12}$$

$$y_3 = g_{31} y_1 + \delta_3 \tag{13}$$

The unit space generating unit 211 configures a measured vector $Y_0$ by arranging the measured values $y_1$, $y_2$, and $y_3$ of a plurality of past time points $t_1, t_2, \ldots,$ and $t_n$ in the time direction. The measured vector $Y_0$ is indicated as in the following Formula (14).

$$Y_0 = \left[ \begin{bmatrix} y_1 \\ y_2 \\ y_3 \end{bmatrix}_1 \begin{bmatrix} y_1 \\ y_2 \\ y_3 \end{bmatrix}_2 \cdots \begin{bmatrix} y_1 \\ y_2 \\ y_3 \end{bmatrix}_n \right] \tag{14}$$

Further, if the conjugate transpose is represented by *, the covariance matrix of the complex numbers is represented by the following Formula (15) and has the same format as a real number.

$$Q = \frac{1}{N} Y_0 Y_0^* \tag{15}$$

The Mahalanobis distance calculating unit 212 calculates the Mahalanobis distance. If the detection signal (measured value) of the vibration of the rotational shaft 10 of the rotating machine 100 serving as the monitoring target is y, the Mahalanobis distance of the measured value y can be obtained by the following Formula (16).

$$MD = \sqrt{y^T Q^{-1} y} \tag{16}$$

Here, transfer functions $g_{21}$ and $g_{31}$ are expressed by the following Formulas (17) and (18), respectively, and observation noises $\delta_2$ and $\delta_3$ are expressed by the following Formulas (19) and (20), respectively.

$$g_{21} = -1 + j \tag{17}$$

$$g_{31} = -0.01 j \tag{18}$$

$$\delta_2 = 0.01 \cdot N(0,1) + 0.01 j \cdot N(0,1) \tag{19}$$

$$\delta_3 = 0.00001 \cdot N(0,1) + 0.0001 j \cdot N(0,1) \tag{20}$$

Then, a unit space Q generated by the unit space generating unit 221 is indicated by the following Formula (21).

$$Q = \begin{bmatrix} 2.001 & 2.001-2.001j & 0.000-0.020j \\ 2.001+2.001j & 4.002 & 0.020-0.020j \\ 0.000+0.020j & 0.020+0.020j & 0.0002 \end{bmatrix} \quad (21)$$

Further, it is assumed that a measured value $y_{good}$ when the state of the rotating machine 100 is normal is decided as in the following Formula (22).

$$y_{good} = \begin{bmatrix} 1 \\ g_{21} \\ g_{31} \end{bmatrix} \quad (22)$$

At this time, the Mahalanobis distance MD of the measured value $y_{good}$ obtained on the basis of the unit space Q indicated by Formula (21) is "0.707" as indicated in the following Formula (23).

$$MD = \sqrt{y_{good}^* Q^{-1} y_{good}} \quad (23)$$
$$= 0.707$$

On the other hand, it is assumed that a measured value $y_{bad}$ when the state of the rotating machine 100 is abnormal is decided as in the following Formula (24).

$$y_{bad} = \begin{bmatrix} 1 \\ g_{21} \\ g_{31} \cdot (1+0.1j) \end{bmatrix} \quad (24)$$

Similarly, if the Mahalanobis distance MD of the measured value $y_{bad}$ is obtained on the basis of the unit space Q indicated by Formula (21), it is "70.1" as indicated in the following Formula (25).

$$MD = \sqrt{y_{bad}^* Q^{-1} y_{bad}} \quad (25)$$
$$= 70.1$$

As described above, if the Mahalanobis distance calculated using the abnormality detecting apparatus 2 according to the present embodiment, the Mahalanobis distance in the abnormal state is approximately 100 times the Mahalanobis distance at normal times, and thus it is clear that an abnormality has occurred. Therefore, the abnormality detecting apparatus 2 can detect the presence or absence of an abnormality in the rotating machine 100 with a high sensitivity from the vibration of the rotational shaft 10 of the rotating machine 100.

(Comparative Example)

Further, an example in which the state of a rotating machine is determined by a method of the related art will be described as a comparative example.

Further, transfer functions $g_{21}$ and $g_{31}$ and observation noises $\delta_2$ and $\delta_3$ are similar to those in the above-described example.

In the method of the related art, the amplitude and the phase of the vibration of the rotational shaft are treated as information acquired from different sensors. Therefore, if the vibration is measured at the three observation positions P1, P2, and P3, similarly to the above-described example, a measured value y including a total of 6 signals, that is, the amplitudes of the three positions corresponding to the observation positions P1, P2, and P3 and the phases of the three positions, is acquired (see Formula (1)). For this reason, the unit space Q generated by the method of the related art has a size of 6×6, as indicated in Formula (26) below.

$$Q = \begin{bmatrix} 2.001 & 2.830 & 0.020 & -0.026 & -0.004 & -0.004 \\ 2.830 & 4.002 & 0.028 & -0.037 & -0.006 & -0.005 \\ 0.020 & 0.028 & 0.0002 & -0.000 & -0.000 & -0.000 \\ -0.026 & -0.037 & -0.000 & 3.296 & 1.131 & -0.430 \\ -0.004 & -0.006 & -0.000 & 1.131 & 3.261 & 1.085 \\ -0.004 & -0.005 & -0.000 & -0.430 & 1.085 & 3.239 \end{bmatrix} \quad (26)$$

Further, it is assumed that the measured value $y_{good}$ when the state of the rotating machine 100 is normal is decided as in the following Formula (27).

$$y_{good} = \begin{bmatrix} 1 \\ \sqrt{(\mathrm{Re}\,(g_{21}))^2 + (\mathrm{Im}\,(g_{21}))^2} \\ \sqrt{(\mathrm{Re}\,(g_{31}))^2 + (\mathrm{Im}\,(g_{31}))^2} \\ 0 \\ \tan^{-1}(\mathrm{Im}\,(g_{21})/\mathrm{Re}\,(g_{21})) \\ \tan^{-1}(\mathrm{Im}\,(g_{31})/\mathrm{Re}\,(g_{31})) \end{bmatrix} \quad (27)$$

At this time, the Mahalanobis distance MD of the measured value $y_{good}$ obtained on the basis of the unit space Q represented by Formula (27) is "1.14" as indicated in the following Formula (28).

$$MD = \sqrt{y_{good}^* Q^{-1} y_{good}} \quad (28)$$
$$= 1.14$$

On the other hand, it is assumed that the measured value $y_{bad}$ when the state of the rotating machine 100 is abnormal is decided as in the following Formula (29).

$$y_{bad} = \begin{bmatrix} 1 \\ \sqrt{(\mathrm{Re}\,(g_{21}))^2 + (\mathrm{Im}\,(g_{21}))^2} \\ \sqrt{(\mathrm{Re}\,(g_{31}\cdot(1+0.1j)))^2 + (\mathrm{Im}\,(g_{31}\cdot(1+0.1j)))^2} \\ 0 \\ \tan^{-1}(\mathrm{Im}\,(g_{21})/\mathrm{Re}\,(g_{21})) \\ \tan^{-1}(\mathrm{Im}\,(g_{31}\cdot(1+0.1j))/(g_{31}\cdot(1+0.1j))) \end{bmatrix} \quad (29)$$

Similarly, if the Mahalanobis distance MD of the measured value $y_{bad}$ is obtained on the basis of the unit space Q indicated by Formula (27), it is "5.05" as indicated in the following Formula (30).

$$MD = \sqrt{y_{bad}^* Q^{-1} y_{bad}} \qquad (30)$$
$$= 5.05$$

Thus, in the comparative example using the method of the related art, the Mahalanobis distance at the time of an abnormality is about 5 times the Mahalanobis distance at normal times.

As compared with the comparative example using the method of the related art, in the example using the abnormality detecting apparatus 2 according to the present embodiment, the Mahalanobis distance in the abnormal state becomes 1 about 100 times as large as that in normal state as described above. Thus, it can be understood that the abnormality detection accuracy is greatly improved as compared to the comparative example.

(Hardware Configuration of Abnormality Detecting Apparatus)

Figure 3:
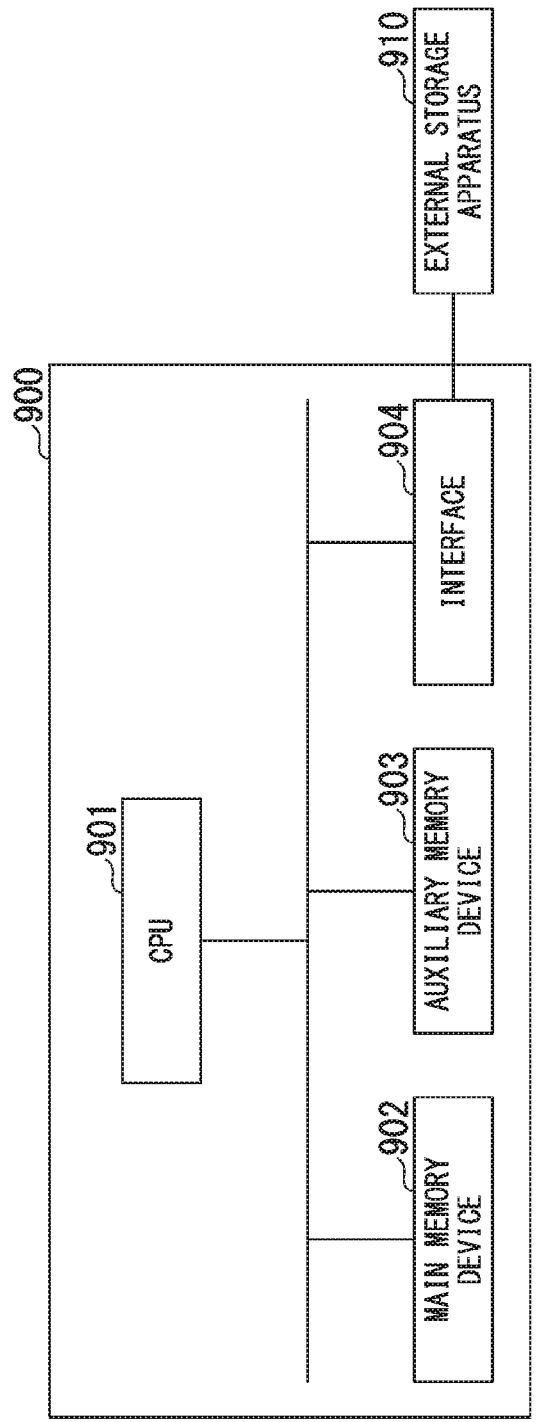
FIG. 3 is a diagram showing an example of a hardware configuration of an abnormality detecting apparatus according to an embodiment of the present invention.

FIG. 3 is a diagram showing an example of a hardware configuration of an abnormality detecting apparatus according to an embodiment of the present invention.

Hereinafter, an example of the hardware configuration of the abnormality detecting apparatus 2 will be described with reference to FIG. 3.

As shown in FIG. 3, a computer 900 includes a CPU 901, a main memory device 902, an auxiliary memory device 903, and an interface 904.

The abnormality detecting apparatus 2 is installed in the computer 900. Further, an operation of each processing unit described above is stored in the auxiliary memory device 903 in the form of a program. The CPU 901 (the processor 21) reads a program from the auxiliary memory device 903, develops it onto the main memory device 902, and executes the above-described process in accordance with the program. Further, the CPU 901 secures a storage area used for various types of processes by the abnormality detecting apparatus 2 in the main memory device 902 in accordance with the program. Further, the CPU 901 secures a storage area for storing data being processed in the auxiliary memory device 903 (the storage medium 22) in accordance with the program.

Examples of the auxiliary memory device 903 include a hard disk drive (HDD), a solid-state drive (SSD), a magnetic disk, a magneto-optical disc, a compact disc read only memory (CD-ROM), a digital versatile disc read only memory (DVD-ROM), and a semiconductor memory. The auxiliary memory device 903 may be an internal medium directly connected to a bus of the computer 900 or may be an external medium connected to the computer 900 via the interface 904 or a communication line. Further, in a case where the program s distributed to the computer 900 via a communication line, the computer 900 that has received the distributed program may develop the program onto the main memory device 902 and execute the above-described process. In at least one embodiment, the auxiliary memory device 903 is a non-temporary tangible storage medium.

The program may be a program for realizing some of the functions described above. Further, the program may be a so-called differential file (differential program) that realizes the above-described functions in combination with other programs already stored in the auxiliary memory device 903.

(Operations and Effects)

As described above, the abnormality detecting apparatus 2 according to the present embodiment includes the processor 21 that executes the measured value acquisition process of acquiring, on the basis of the detection signal output from the vibration sensor 110 that measures the vibration of the rotational shaft 10 of the rotating machine 100, the measured value y including the complex number which is converted from the amplitude and the phase of the vibration, the Mahalanobis distance calculation process of calculating the Mahalanobis distance MD of the measured value y acquired at the time point t at which the rotating machine 100 is evaluated on the basis of the unit space configured with a plurality of measured values y acquired at a plurality of past time points, and the determination process of determining that an abnormality has occurred in the rotating machine 100 in a case where the calculated Mahalanobis distance MD exceeds a predetermined threshold value. In the method of the related art, since the amplitude and the phase of the vibration of the rotational shaft are treated as information detected by different sensors, there is a possibility that the abnormality of the rotating machine is unable to be detected accurately from the amplitude and the phase. However, the abnormality detecting apparatus 2 according to the present embodiment can treat the feature quantity of the vibration of the rotational shaft 10 as a pair of measured values including the amplitude and the phase, and thus the accuracy of detecting the abnormality in the rotating machine 100 can be improved.

Further, the processor 21 of the abnormality detecting apparatus 2 acquires a plurality of measured values $y_1$, $y_2$, and $y_3$ corresponding to the different observation positions P1, P2, and P3 of the rotational shaft 10 in the measured value acquisition process.

Accordingly, the abnormality detecting apparatus 2 can detect the abnormality in the rotating machine 100 more accurately.

Further, the processor is configured to measure the vibration on at least one of a plurality of observation positions in the measured value acquisition process, and acquire the measured value including amplitude and a phase of a plurality of frequencies included in vibration on at least one of the plurality of the observation positions. Accordingly, the abnormality detecting apparatus n detect the abnormality in the rotating machine 100 more accurately.

Further, the rotating machine 100 according to the present embodiment includes the rotational shaft 10, the vibration sensor 110 that measures the vibration of the rotational shaft 10, and the abnormality detecting apparatus 2.

Although the embodiment of the present invention has been described above in detail, the present invention is not limited thereto, and some design changes can also be made without limiting the technical spirit of the present invention as long as it does not depart from the technical spirit of the present invention.

For example, in the above-described embodiment, the vibration measuring device 11 is configured to include the frequency analyzing device 111, but the present invention is not limited thereto. In other embodiments, the abnormality detecting apparatus 2 may include a frequency analyzing device, and the frequency analyzing device of the abnormality detecting apparatus 2 may perform frequency analysis on the basis of a detection signal output from the vibration sensor 110.

Further, in the above-described embodiment, the method to detect abnormality based on the Mahalanobis distance, but the present invention is not limited to be applied to the aspect using Mahalanobis distance. A modification example of the above-described embodiment will be explained below with reference to the appended drawings.

(Functional Configuration of Abnormality Detecting Apparatus in a Modified Example)

Figure 4:
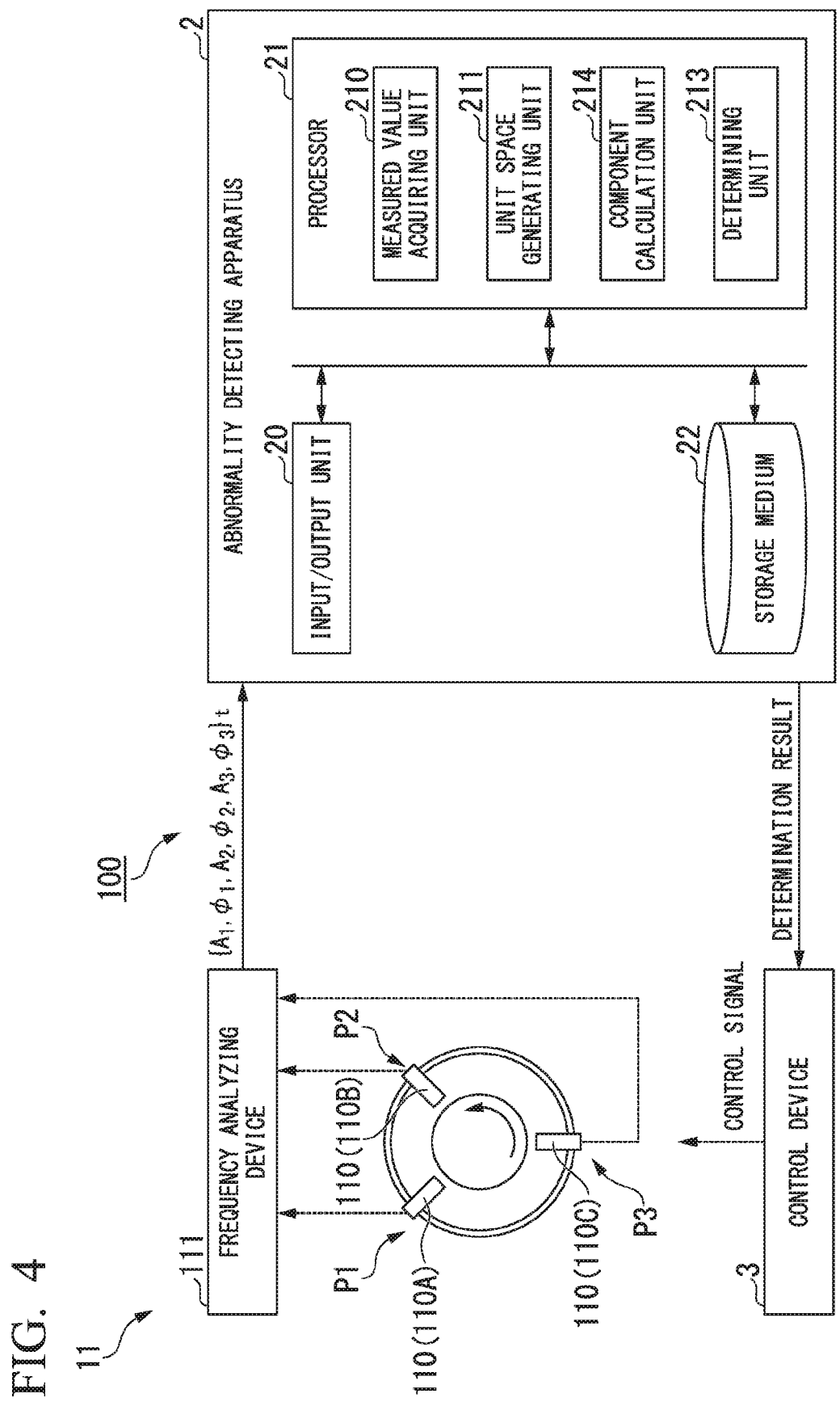
FIG. 4 is a diagram showing a configuration of a rotating machine according to a modification example of an embodiment of the present invention.

FIG. 4 is a diagram showing a configuration of a rotating machine according to a modification example of an embodiment of the present invention. As shown FIG. 4, the processor 21 of the abnormality detecting apparatus 2 of the modified example includes a component calculation unit 214 as a functional unit, instead of the Mahalanobis distance calculating unit 212.

The component calculation unit 214 performs a process of calculating a plurality of components into which the measured value y, acquired by the measured value acquiring unit 210, is decomposed with respect to a direction of a singular vector obtained by performing a singular value decomposition of the unit space.

Further, the determining unit 213 of the modified example performs a process of comparing a magnitude of the plurality of components into which the measured value y is decomposed with respect to the direction of the singular vector with the plurality of singular values obtained by performing the singular value decomposition of the unit space individually with respect to the direction of the singular vector, and a process of determining that an abnormality has occurred based on a plurality of compared results.

(Process Flow of Abnormality Detecting Apparatus)

Figure 5:
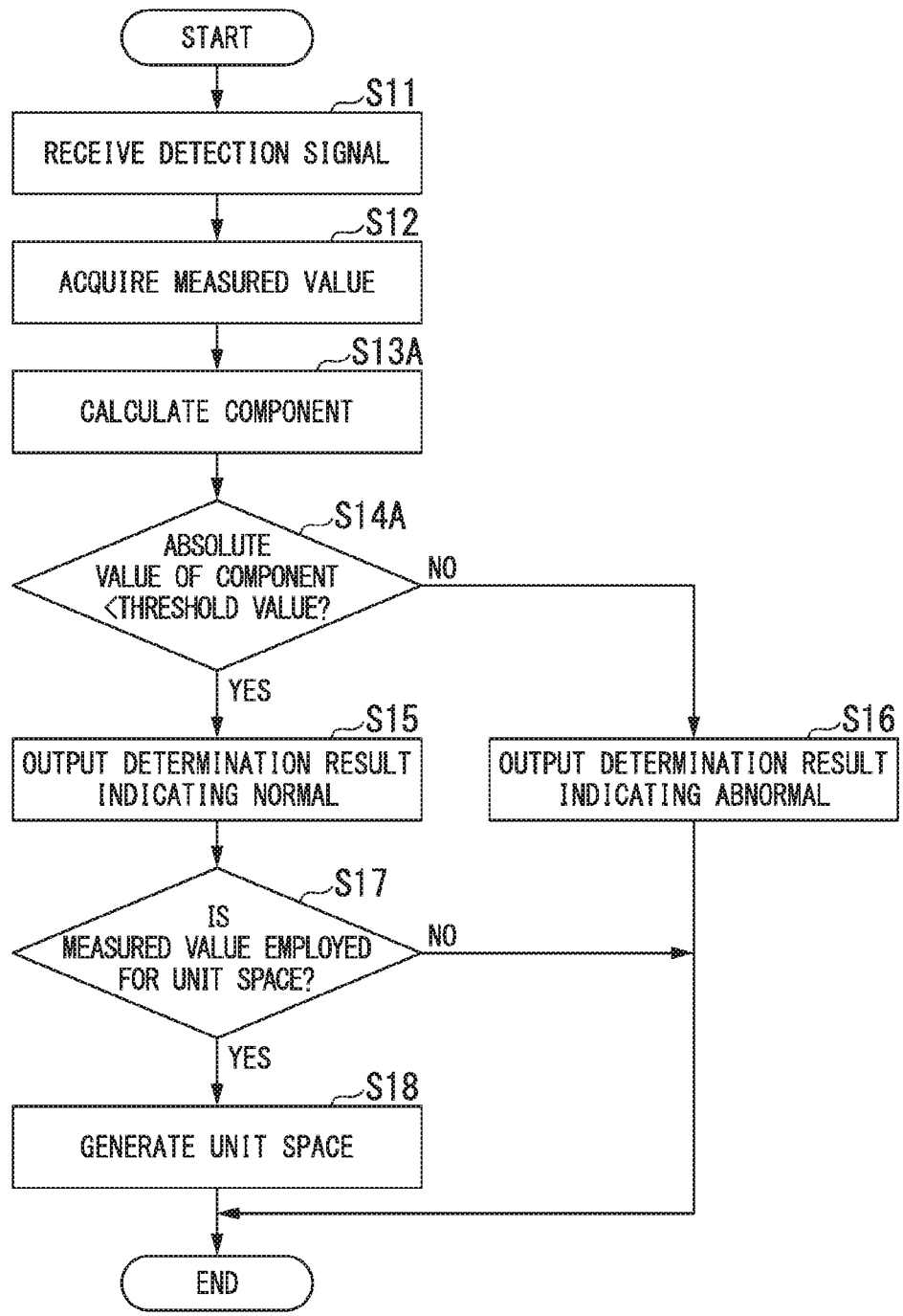
FIG. 5 is a flowchart showing an example of a process of an abnormality detecting apparatus according to a modification example of an embodiment of the present invention.

FIG. 5 is a flowchart showing an example of a process of an abnormality detecting apparatus according to a modification example of an embodiment of the present invention. As steps S11, S12, S15, S16, S17 and S8 shown in FIG. 5 are same as the corresponding steps in FIG. 2, the explanation thereof has been omitted. Hereinafter, processes performed by the component calculation unit 214 (step S13A) and the determining unit 213 (step S14A) of the modified example will be described in detail with reference to FIG. 5.

As shown in FIG. 5, the component calculation unit 214 calculates components $\rho_i$ (i=1, 2, . . . , m) of the measured value y (step S13A). Specifically, the component calculation unit 214 calculated the components $\rho_i$ by the following procedures.

The unit space is able to be resolved into singular values as in the following Formula (31).

$$Q = [u_1 \ u_2 \ \cdots \ u_m] \begin{bmatrix} \sigma_1 & 0 & \cdots & 0 \\ 0 & \sigma_2 & \cdots & 0 \\ \vdots & \vdots & \ddots & \vdots \\ 0 & 0 & \cdots & \sigma_m \end{bmatrix} [u_1 \ u_2 \ \cdots \ u_m]^* \quad (31)$$

Here, m indicates the number of the measured values. $u_i$ (i=1, 2, . . . , m) indicates a singular vector and is a complex number vector having a size of m×1. $\sigma_i$ (i=1, 2, . . . , m) indicates singular value and is a non-negative real number.

The component calculation unit 214 calculates the components $\rho_i$ (i=1, 2, . . . , m) into which the measured value y is decomposed with respect to the direction of the singular vector $u_i$ (i=1, 2, . . . , m) by using the following Formula (32).

$$\rho_i = u_i^* y \quad (32)$$

The component calculation unit 214 of the modified example outputs an absolute value of the component $\rho_i$ into which the measured value y is decomposed with respect to the direction of the singular vector $u_i$ to the determining unit 213. The absolute value of the component $\rho_i$ is represented by the following Formula (33).

$$|\rho_i| = \sqrt{\rho_i \rho_i^*} \quad (33)$$

The determining unit 213 performs a comparing process of comparing the absolute value of the components $\rho_i$ into which the measured value y is decomposed with respect to the direction of the singular vector $u_i$ with a square root of each singular values σi corresponding to the singular vector $u_i$ individually with respect to each singular vectors. As the space unit Q is a covariance matrix including the plurality of measured values y acquired when the rotating machine 100 is in a normal state, the singular values $\sigma_i$ represent variation of square values of the absolute values of the components $\rho_i$ when the rotating machine 100 is in the normal state. Therefore, in case where the rotating machine 100 is in the normal state at a certain time, $\rho_i \rho_i^*$ is supposed to be a value close to the singular value $\sigma_i$. Based on such a premise, the determining unit 213 compares the absolute values of the components $\rho_i$ and the root values of the singular values $\sigma_i$ with respect to each singular vectors $u_i$ (i=1, 2, . . . , m) (step S14A), and outputs the determined results (step S15 or S16). For example, if the absolute value of the component $\rho_i$ is less than a threshold value based on the singular value $\sigma_i$ (step S14A: YES), the determining unit 213 outputs the determined result indicating the status is "normal" (steps S15). If the absolute value of the component $\rho_i$ is equal to or more than the threshold value (step S14A: NO), the determining unit 213 outputs the determined result indicating the status is "abnormal" (steps S16). Specifically, the determining unit 213 determines that the status is "abnormal" when the following Formula (34) is completed.

$$\sqrt{\rho_i \rho_i^*} > \sqrt{\alpha_i \cdot \sigma_i \cdot \beta_i} \quad (34)$$

Here, $\alpha_i$ and $\beta_i$ in the Formula (34) are positive constants which are defined with respect to each of the singular vectors $u_i$ (i=1, 2, . . . , m).

In a technique using the MT method of the related art (for example, the technique described in Japanese Patent No. 5101396, as described above, there is the possibility of the sensitivity of abnormality detection decreasing. However, since the abnormality detecting apparatus 2 according to the modified example compares the absolute value of the component $\rho_i$, into which the measured value y is decomposed with respect to the direction of the singular vector $u_i$, with the square root of the singular value $\sigma_i$ corresponding to the singular vector $u_i$ individually with respect to the singular vector, the abnormality detection apparatus 2 is able to determine the occurrence of the abnormality without calculating Mahalanobis distance. Thereby, it is not necessary to consider a deterioration in the accuracy of calculation due to division by zero which is possibly caused by calculating the Mahalanobis distance, and thus even in a case where the influence of this abnormality appears in the singular values $\sigma_i$ having a small component, the abnormality detecting apparatus 2 can be used in an abnormality determination without excluding them. As a result, the abnormality detecting apparatus 2 can suppress a decrease in the sensitivity of abnormality detection, and improve the accuracy of abnormality detection.

What is claimed is:

1. An abnormality detecting apparatus that is configured to detect a presence or absence of an abnormality in a rotating machine, comprising:
  a processor that is configured to execute
    a measured value acquisition process of acquiring, on a basis of a detection signal output from a vibration sensor that is configured to measure vibration caused by rotation of the rotating machine, an amplitude and a phase of the vibration, and converting the amplitude and the phase of the vibration to a complex number to represent a measured value;

a Mahalanobis distance calculation process of calculating a Mahalanobis distance of the measured value acquired at a time point at which the rotating machine is evaluated on a basis of a unit space configured with a plurality of measured values acquired at a plurality of past time points; and a determination process of determining that an abnormality has occurred in the rotating machine in a case where the calculated Mahalanobis distance exceeds a predetermined threshold value.

2. The abnormality detecting apparatus according to claim 1, wherein the processor is configured to measure the vibration at a plurality of different observation positions in the measured value acquisition process, and acquire a plurality of measured values corresponding to each of the plurality of observation positions.

3. A rotating machine, comprising:
a rotational shaft;
a vibration sensor that is configured to measure vibration of the rotational shaft; and
the abnormality detecting apparatus according to claim 1.

4. The abnormality detecting apparatus according to claim 1, wherein the processor is configured to measure the vibration on at least one of a plurality of observation positions in the measured value acquisition process, and acquire the measured value included in vibration on at least one of the plurality of the observation positions.

5. An abnormality detection method of detecting a presence or absence of an abnormality in a rotating machine, comprising:
a step of acquiring, on a basis of a detection signal output from a vibration sensor that is configured to measure vibration caused by rotation of the rotating machine, an amplitude and a phase of the vibration, and converting the amplitude and the phase of the vibration to a complex number to represent a measured value;
a step of calculating a Mahalanobis distance of the measured value acquired at a time point at which the rotating machine is evaluated on a basis of a unit space configured with a plurality of measured values acquired at a plurality of past time points; and
a step of determining that an abnormality has occurred in the rotating machine in a case where the calculated Mahalanobis distance exceeds a predetermined threshold value.

6. A non-transitory computer readable medium storing a program that causes a computer of an abnormality detecting apparatus that is configured to detect a presence or absence of an abnormality in a rotating machine to execute:
a step of acquiring, on a basis of a detection signal output from a vibration sensor that is configured to measure vibration caused by rotation of the rotating machine, an amplitude and a phase of the vibration, and converting the amplitude and the phase of the vibration to a complex number to represent a measured value;
a step of calculating a Mahalanobis distance of the measured value acquired at a time point at which the rotating machine is evaluated on a basis of a unit space configured with a plurality of measured values acquired at a plurality of past time points; and
a step of determining that an abnormality has occurred in the rotating machine in a case where the calculated Mahalanobis distance exceeds a predetermined threshold value.

7. An abnormality detecting apparatus that is configured to detect a presence or absence of an abnormality in a rotating machine, comprising:
a processor that is configured to execute
a measured value acquisition process of acquiring, on a basis of a detection signal output from a vibration sensor that is configured to measure vibration caused by rotation of the rotating machine, an amplitude and a phase of the vibration, and converting the amplitude and the phase of the vibration to a complex number to represent a measured value;
a component calculation process of calculating a plurality of components into which the measured value is decomposed with respect to a direction of a singular vector obtained by performing a singular value decomposition of a unit space configured of a plurality of measured values acquired at a plurality of points in a past;
a comparing process of comparing a magnitude of the plurality of components into which the measured value is decomposed with respect to the direction of the singular vector with the plurality of singular values obtained by performing the singular value decomposition of the unit space individually with respect to the direction of the singular vector; and
a determination process of determining that an abnormality has occurred in the rotating machine based on a result of the comparing process.

8. An abnormality detecting method of detecting a presence or absence of an abnormality in a rotating machine, comprising:
a step of acquiring, on a basis of a detection signal output from a vibration sensor that is configured to measure vibration caused by rotation of the rotating machine, an amplitude and a phase of the vibration, and converting the amplitude and the phase of the vibration to a complex number to represent a measured value;
a step of calculating a plurality of components into which the measured value is decomposed with respect to a direction of a singular vector obtained by performing a singular value decomposition of a unit space configured of a plurality of measured values acquired at a plurality of points in a past;
a step of comparing a magnitude of the plurality of components into which the measured value is decomposed with respect to the direction of the singular vector with the plurality of singular values obtained by performing the singular value decomposition of the unit space individually with respect to the direction of the singular vector; and
a step of determining that an abnormality has occurred in the rotating machine based on a result of the comparing step.

9. A non-transitory computer readable medium storing a program that causes a computer of an abnormality detecting apparatus that is configured to detect a presence or absence of an abnormality in a rotating machine to execute:
a step of acquiring, on a basis of a detection signal output from a vibration sensor that is configured to measure vibration caused by rotation of the rotating machine, an amplitude and a phase of the vibration, and converting the amplitude and the phase of the vibration to a complex number to represent a measured value;
a step of calculating a plurality of components into which the measured value is decomposed with respect to a direction of a singular vector obtained by performing a singular value decomposition of a unit space configured of a plurality of measured values acquired at a plurality of points in a past;

a step of comparing a magnitude of the plurality of components into which the measured value is decomposed with respect to the direction of the singular vector with the plurality of singular values obtained by performing the singular value decomposition of the unit space individually with respect to the direction of the singular vector; and a step of determining that an abnormality has occurred in the rotating machine based on a result of the comparing step.

\* \* \* \* \*